Nov. 6, 1945.  G. S. MIKHALAPOV  2,388,430
METHOD AND APPARATUS FOR WELDING
Filed Dec. 13, 1940

INVENTOR
GEORGE S. MIKHALAPOV
BY
ATTORNEY

Patented Nov. 6, 1945

2,388,430

UNITED STATES PATENT OFFICE 2,388,430

METHOD AND APPARATUS FOR WELDING

George S. Mikhalapov, Media, Pa., assignor, by mesne assignments, to The Taylor-Winfield Corporation, Warren, Ohio, a corporation of Ohio Application December 13, 1940, Serial No. 370,044

14 Claims. (Cl. 219—4)

My invention relates to an improved method of and apparatus for resistance welding of the form utilizing the principle of energy stored in an electromagnetic inductive circuit.

Resistance welding apparatus as heretofore built consists essentially of a welding transformer, a suitable pressure application mechanism, a source of direct current energy and one or more mechanical switches for applying and interrupting the flow of electrical current through the welding transformer. In such welding apparatus the work is clamped between suitable points on the pressure application mechanism and direct current potential is applied to the welding transformer. As the welding transformer is purposely made highly inductive the current rises gradually in accordance with the well-known exponential manner. At a predetermined value of current the switch mechanism is made to open either at once or, in case of several switches, progressively, in an attempt to interrupt suddenly the flow of the primary current. The interruption of the primary current causes collapse of the electromagnetic field which attempts to transmit its energy to the primary and secondary windings of the welding transformer. If the primary circuit is effectively interrupted almost the entire energy is transmitted to the secondary winding and thus to the weld. However, these prior machines have very serious objections such, for example, that any given machine is unable to weld a wide range of metal or is unable to do so with consistent effectiveness.

The elimination of these objections has heretofore been difficult if not impossible because of what I now find to be a phenomenon that the inherent electrical laws of a purely inductive circuit are such that no matter what resistance is offered to the flow of current the decay of the current will take a certain definite time, said time depending on the physical characteristics of the circuit and in case of practical circuits the said time being quite appreciable. While this decay is taking place energy is dissipated in the arc created at the point of current interruption. Since the time of decay is fixed the time of the arc is also fixed and heretofore the existence of the foregoing phenomenon has been a barrier to obtaining an adequate solution to the problem of overcoming the objectionable results arising from said arcing condition. In the machine used by the prior art as described above there is a further difficulty arising from the manner of rise and decay of the welding current. This rise and decay are the same for all values of the primary current and are a function of the inherent characteristics of the machine such as inductance and resistance. Thus the only variation in the welding current that was heretofore possible was secured by changing its peak or maximum value which, in turn, meant that on any one machine the rate of rise and decay was either excessively slow for proper welding at low value of currents necessary for welding thin sheets or excessively high for proper welding at high values of current necessary for welding comparatively heavy sheets.

It is an object of my invention to provide an improved method of and apparatus for consistently and effectively welding a wide range of metal thicknesses on one machine. It is a further object to eliminate all arcing which has heretofore been inherent with the prior art and in addition to eliminating the foregoing I am able to provide means for permitting proper rate of current rise and decay at all maximum values of welding current. A further object is to provide an improved method and apparatus that will allow proper control of the above phenomenon and thus obtain satisfactory welding of a wide range of metal gauges on one machine.

Another object is to provide an improved method and apparatus that is relatively simple and economical in manufacture, operation and maintenance and is thoroughly reliable and durable while at the same time being able to accomplish consistent effective welding on a wide range of metal thicknesses.

Other objects and advantages will be more apparent to those skilled in the art from the following description of the accompanying drawing in which.

Figure 1:
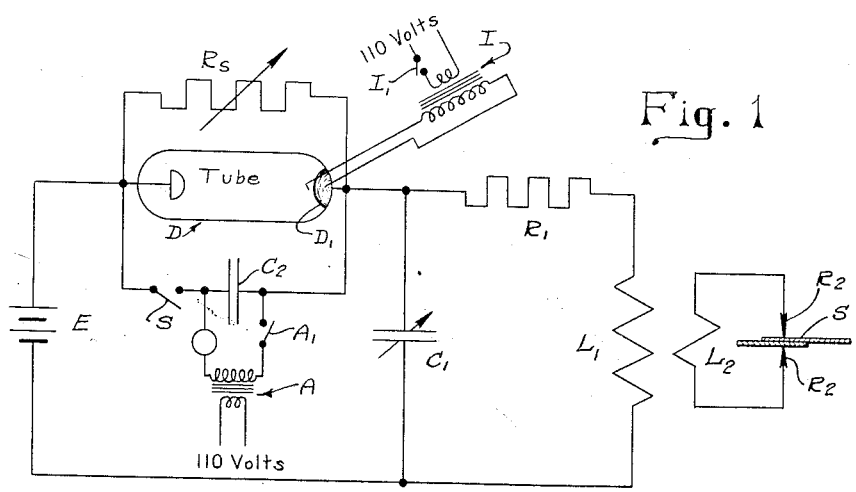
Fig. 1 is a wiring diagram embodying my invention.

The specific embodiment of the invention as disclosed herein briefly consists of a conventional source of current E such as a storage battery or any usual current rectifying device, a suitable gaseous discharge tube D, a small high voltage condenser $C_2$, such for example as say 10 microfarads at 5000 volts precharged to a proper value such as for example 600 volts by means of an auxiliary circuit A which as shown in the diagram has a step-up transformer and a rectifying tube, a suitable current carrying variable resistor $R_3$ in the neighborhood of 50 to 100 ohms, for example, a welding machine of the conventional electro-magnetic storage type having transformer coils $L_1$ and $L_2$, a small high voltage variable or adjustable capacitor $C_1$ connected in parallel with $L_1$ and pressure application means $R_2$ between which work sheets S to be welded are clamped. The gaseous discharge tube D above mentioned may, for example, be of the ignitron or thyratron type in which the electrical conducting path has very rapid deionizing qualities, the tube also being capable of withstanding high voltage in either direction. These tubes per se are well-known and hence further detailed description is not necessary but for purposes of illustration the ignitron type is shown herein which by way of one specific example may be the Raytheon Manufacturing Company ignitor tube No. RX 226.

The tube possesses rapid deionization characteristics in order that cessation of the flow of current of a few micro-seconds is sufficient to prevent resumption of the flow of current on return of high voltage after the period of non-conduction. Briefly, the tube of the above type consists of a vacuum bulb containing an anode, a cathode and a well of mercury $D_1$ which is vaporized by means of an auxilary ignition circuit I controlled by a switch $I_1$, the foregoing providing a uni-directional conductor between the cathode and anode once the ionization has taken place through the operation of the ignition circuit I. This tube is of course well-known in the art and hence need not be further explained or illustrated.

*Operation.*—In operation my improved method and apparatus is started by firing of the ignition circuit. Because of the high inductive properties of the stored energy type welding machine the current will increase in a well-known exponential manner and reach a steady flow in a brief time. Once the steady flow is reached the device is ready for operation which is accomplished by the closure of switch S which momentarily impresses the high voltage of condenser $C_2$ (previously precharged by temporary closure of a normally open switch $A_1$) on to the terminals of the tube in such a fashion that the normal polarity of the tube is instantaneously reversed. The impression of reverse polarity on the tube has the effect of arresting the flow of current through the tube.

This interruption of flow of the primary current is only possible because of the presence of condenser $C_1$ which changes the characteristics of the original circuit which becomes no longer purely inductive. However, as the effect of the condenser $C_1$ is extremely brief it is imperative that the operation of the tube D be extremely rapid as otherwise the current would resume its flow as is indeed the case with the switching devices used by the prior art. However, in my improved combination the time of interruption effected by the electronic tube is sufficiently brief so that the rapid rise of the voltage caused by the inductive circuit does not restore the flow of the current and a premanent interruption of current can take place.

It will be seen from the above description that condenser $C_2$ serves a double function—first, provides a potential opposite to the normal potential across the tube and second—serves as a cushion in slowing down the normal votage across the tube. The condenser $C_1$ across the terminals of the welding machine aids the second function of condenser $C_2$. The condensers $C_2$ and $C_1$ are capable of being combined into one condenser placed in the position of condenser $C_2$ but it is more practical to separate the condenser into two units $C_1$ and $C_2$. The magnitude of condenser $C_1$ is approximately the same as condenser $C_2$.

The sudden interruption of the flow of current through the welding machine causes the well-known phenomenon of the collapse of the magnetic field in transformer $L_1$, $L_2$ which is utilized in this type of welding machine thereby producing a heavy current through the secondary winding of the machine and thus furnishing the source of welding power and effecting the welding at $R_2$ in the normal manner.

Figure 2:
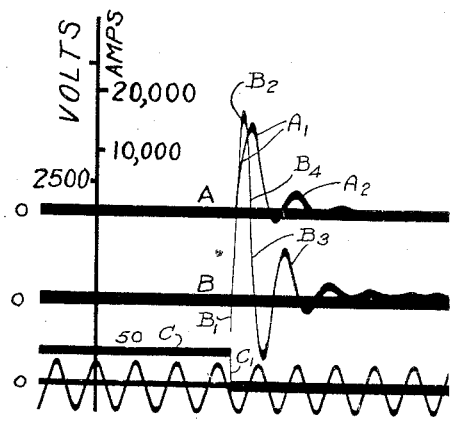
Fig. 2 is an oscillogram showing the current and voltage effects during operation of my improved method and apparatus.

The effect of my improved operation is shown in Fig. 2 where an oscillogram C represents the flow of current in the primary winding $L_1$ of the welding transformer. The oscillogram B represents the voltage across the tube and oscillogram A represents the welding current through the secondary winding $L_2$ of the welding transformer. In operation of the circuit it is seen that the primary current as at $C_1$ drops to zero almost instantaneously. The voltage across the tube becomes negative as at $B_1$ for an extremely brief period and then rises extremely rapidly as at $B_2$ to a fairly high value such as 3000 or 4000 volts and then decays in a normal oscillating manner as at $B_3$. The secondary current A rises rapidly as at $A_1$ reaching its maximum value at the time the voltage passes through zero at $B_4$ and then decays in a damped oscillating manner normal to this type of circuit as at $A_2$.

Figure 3A:
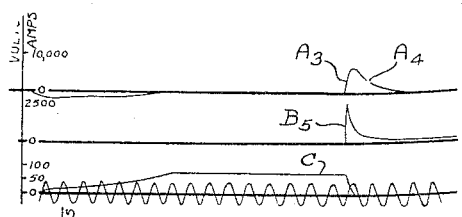
Figs. 3A and 3B are oscillograms showing the current and voltage effects for different welding conditions.
Figure 3B:
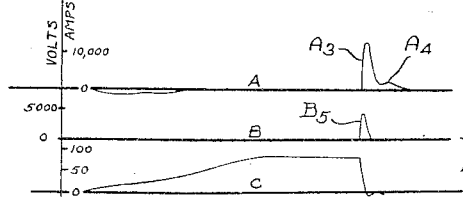

The above operation is secured by a circuit as described above except without the presence of the resistance $R_s$. Should resistance $R_s$ be present the operation will be slightly different as shown in either oscillogram Fig. 3A or B insofar as the presence of the resistor will dampen out the oscillation of both the primary voltage B and the secondary current $A_3$ and produce a unidirectional current decay $A_4$. Fig. 3A shows the behavior of the circuit with a comparatively low value resistance $R_s$ and Fig. 3B with a considerably higher resistance $R_s$. This resistance may be adjusted as desired.

As a result of my improved operation, I am able to produce a desirable welding current whose magnitude and manner of decay can be governed and varied at will by changing the capacity of condensers $C_1$ or $C_2$, the resistance of resistor $R_s$ and the magnitude of the primary current. I not only eliminate all uncertainties and variations caused by arcing inherent in the prior art mechanical means of current interruption and thus provide an extremely reliable method of operation, but in addition I provide a means for extremely rapid rise of secondary current which is impossible to accomplish in a purely inductive circuit or a circuit depending on a mechanically operated switch for current interruption due to the inherent laws of a purely inductive circuit as explained above. A further result is that by changing the value of condensers $C_1$ or $C_2$ and resistance $R_s$ the rate of secondary current rise and decay can be varied within wide scope which is not possible with the prior conventional mechanically operated switch circuit.

The above features are particularly important where it is desired to weld a wide range of metal thicknesses on the same machine. In the conventional type of welding machines employing the electro-magnetic stored energy principle the rate of rise and rate of decay of the secondary current are virtually fixed by the electrical characteristic of the welding machine itself. Further-more, it has been extremely difficult to secure on the same machine both a rapid rise of a current of small magnitude with an ensuing rapid decay necessary for welding thin materials and also a comparatively slower rise of current of large magnitude with a correspondingly slower decay necessary for welding of heavier materials. In my invention both conditions can be easily accomplished by a suitable adjustment of $R_s$ and $C_1$ or $C_2$.

In addition to the above advantages, my method of operation is free of the maintenance problems and troubles which are inherent in mechanical switches operated on high inductive circuits such as are now utilized by the prior art welding machines of that type.

From the disclosure herein it will be seen that briefly by improved method of operating a resistance welding machine of the type employing energy stored in an electro-magnetic circuit consists of establishing an ionize path through which welding transformer current flows, the ionized path having a fixed polarity and then interrupting the current flow through said ionized path by suddenly impressing a voltage of opposite polarity upon the ionized path specifically by discharging a pre-charged condenser and then utilizing condenser capacity to limit the rate of voltage rise across the welding transformer and tube upon the collapse of the current and the electro-magnetic field of the welding transformer. A further refinement of the foregoing method includes the step of allowing a partial flow of primary current upon collapse of the magnetic field by by-passing the current around the deionized portion of the circuit through a resistor thereby changing the oscillatory form of current decay to exponential form and providing means for the control of the rate of decay of the welding current independent of the peak value of said current. My improved method and apparatus readily lends itself to welding a wide range of different thicknesses of material, this being accomplished in a simple but very effective manner by comparatively small variation in the condenser capacity which absorbs flow of current upon the electro-magnetic collapse in addition to the conventional variation of the primary current. In addition to varying the condenser capacity, it is also possible to control in a simple manner the degree with which the current oscillations are smoothed out and the rate and manner of the welding current decay, this being accomplished merely by varying the resistance $R_s$ which partially by-passes the flow around the ionizable portion of the circuit.

It should now be understood that the essence of my invention lies in certain fundamental concepts as regards the electrical phenomena inherent in electromagnetic energy storage systems and as regards practical methods and means whereby such energy may be liberated or discharged to a useful load in such manner as to make the liberated form of energy suitable for effecting resistance welding processes. While heretofore the electromagnetic energy storage principle has been proposed for resistance welding purposes the known practical systems employing the principle were inherently lacking in means for controlling the duration and form of the energy discharge, in their capability of obtaining discharge currents of high peak value, and in means for avoiding the substantial energy loss necessarily occasioned by arcing at the point of interruption of the reactor energizing circuit, all of which has heretofore limited seriously the efficacy of the involved system particularly as employed for resistance welding purposes wherein it is desirable that an effective control be had over the peak value and wave form of the welding current and wherein it is highly desirable to reduce energy losses to a minimum for considerations of economy in the construction and operation of commercial welding machines. The present invention provides exceedingly simple circuit arrangements whereby the limting characteristics of prior electrical power systems utilizing the electromagnetic energy storage principle are largely obviated. Thus, in accordance with the principles of the present invention I am enabled to effect the liberation or discharge of the energy stored in a reactance to a useful load, notably a resistance welding load, in such manner that but a small and insignificant part of the stored energy is dissipated other than in the useful load and that the peak value and the wave form of the discharge current may be readily controlled.

An important feature of the invention is the insertion of a relatively small capacitance across the primary circuit of the energy storage transformer or reactor employed particularly at the time the flow of current through such circuit is interrupted to permit the collapse of the energy storing flux in the storage device thus permitting the energy to be translated by induction into the secondary circuit of the storage device. It has been shown mathematically and verified by experiment that whatever the method employed in interrupting the flow of primary current the effect of the parallel capacitance may be such as to nearly double the peak value of the secondary current and, further, the rate of rise of the value of the secondary current may be readily controlled by varying the value of the capacitance. A capacitance of small value will effect a more rapid rise of secondary current and a higher peak value thereof while a capacitance of lower value decreases the rate of rise and peak value while increasing the duration of the higher secondary current values which range of adjustment is highly desirable in the resistance welding of metal as will be understood by those skilled in the art.

The above advantageous results or characteristics in the nature of the flow of the useful current through the secondary winding of the transformer arise simply from the inserting of the small capacitance across the primary winding of the inductance and the nature of the phenomena may be understood by considering the effect of the capacitance on the current flow through the primary winding, it being observed that the instantaneous strength of the current induced in the secondary is a function of the rate of change in the strength of the primary current. This rate of change determines the speed at which the flux can collapse and thus the speed at which the stored energy is discharged into the secondary circuit. The capacitance together with the total inductance of the primary winding constitutes, in effect, an oscillatory tank circuit with initial energy stored in the inductance far in excess of the energy stored in the capacitance at the time of primary current interruption. Consequently, the current flowing through the primary winding will decrease in magnitude to zero, then reverse with increasing magnitude as will be understood. However, with respect to the secondary the change in the primary current is in the same direction with the maximum rate of change occurring as the primary current wave passes through zero. The higher the tuned frequency of the primary circuit the more rapid, of course, will be the rate of change of the primary current so that the rate of rise and peak value of the induced secondary current will be correspondingly both increased. Thus it will be understood that the use of the capacitance in parallel with the primary of the energy storage inductor superimposes an oscillatory secondary current on the exponential secondary currents which would exist if the primary circuit were not oscillatory. While only the first half cycle or pulse of the secondary current is normally of importance in resistance welding, the magnitude or effect of the oscillatory component in the secondary current may, if desired, be readily suppressed in varying degree by damping the primary circuit. This is accomplished in accordance with the present invention by inserting a variable resistance ($R_s$) in the primary circuit.

While the above outlined advantages can be attained in substanial measure irrespective of the specific method or means employed to interrupt the primary current, the utilization of the capacitance or at least a portion of the capacitance as a means of interrupting conduction in an electric discharge device inserted in the primary circuit results in the attaining of maximum benecuit fits from the principles of the invention since, first, the elimination of any arcing avoids the substantial energy loss from this source and, secondly, the instantaneous interruption of the primary current insures the fullest possible magnitude of the primary voltage and secondary current during the initial half cycle of the oscillatory action. This characteristic is normally desirable, particularly in resistance welding operations, since, as stated above, the initial pulse should contain the greater portion of the energy stored in the transformer. The greater the magnitude of the secondary current during the first pulse the greater will be the quantity of energy contained in this pulse. Further, the effect of the capacitance being connected across the anode-cathode of the discharge device employed is to delay the rise of voltage across the tube by the inductive reactance of the transformer thus insuring complete and continuing de-ionization of the medium in the tube. The capacitance also materially decreases the maximum voltage which will appear across the switch or tube thus further enhancing the consistency of operation of the circuit.

It will of course be understood that various changes in details of construction and arrangement of parts may be made by those skilled in the art without departing from the spirit of the invention as set forth in the appended claims.

I claim:

1. In electric resistance welding apparatus of the electromagnetic energy storage type having an inductive reactor and a secondary welding circuit positioned in operaive inductive relation with respect to said reactor comprising in combination a circuit for applying direct current to said reactor, circuit opening means in said circuit for interrupting the flow of current through said reactor, means to control the rate of rise of the welding current in said secondary circuit comprising a capacitance in parallel with said reactor, and means to control the rate of decay of the current induced in said secondary circuit comprising a resistance connected across said circuit opening means.

2. In electric resistance welding apparatus of the electromagnetic energy storage type having an inductive reactor and a secondary welding circuit positioned in operative inductive relation with respect to said reactor the combination of a circuit for supplying direct current to said reactor, means to open said circuit whereby the flow of current through said reactor is interrupted and the energy stored in said reactor is delivered to said secondary circuit, and means to predetermine the shape of the current wave in said secondary circuit comprising a control impedance having predetermined characteristics connected across said reactor.

3. In electric resistance welding apparatus of the electromagnetic energy storage type having an inductive reactor and a secondary welding circuit positioned in operative inductive relation with respect to said reactor the combination of a circuit for supplying direct current to said reactor, means to open said circuit whereby the flow of current through said reactor is interrupted and the energy stored in said reactor is delivered to said secondary circuit, and means to predetermine the shape of the current wave in said secondary circuit comprising a capacitance having predetermined value connected in shunt with said reactor.

4. In electric resistance welding apparatus of the electromagnetic energy storage type having an inductive reactor and at secondary welding circuit positioned in operative inductive relation with respect to said reactor the combination of a circuit for supplying direct current to said reactor, means to open said circuit whereby the flow of current through said reactor is interrupted and the energy stored in said reactor is delivered to said secondary circuit, means to control the rate of rise of the current induced in said secondary circuit, and means to control the rate of decay of the current in said secondary circuit.

5. In electric resistance welding apparatus of the electromagnetic energy storage type having an inductive reactor and a secondary welding circuit positioned in operative inductive relation with respect to said reactor the combination of a circuit for supplying direct current to said reactor, said circuit including an electric discharge device of the type employing an ionizable medium, and means to interrupt conduction in said discharge device comprising a charged capacitance and means to connect said capacitance across said discharge device in opposite polarity to the relative potentials of the terminals of said discharge device whereby said medium is de-ionized thus interrupting conduction in said device, the arrangement being such that upon said capacitance being connected across said device said capacitance is simultaneously connected in said circuit whereby the same is rendered oscillatory.

6. Apparatus according to claim 5 further including means to vary the effective value of the capacitance connected in said circuit at the time of de-ionization of said medium whereby the rate of increase in the strength of the current in said secondary circuit may be predetermined.

7. In electric resistance welding apparatus of the electromagnetic energy storage type having an inductive reactor and a secondary welding circuit positioned in operative inductive relation with respect to said reactor the combination of a circuit for supplying direct current to said reactor, a capacitance connected across said reactor, said circuit including an electric discharge device of the type employing an ionizable medium, and means to interrupt conduction in said device whereby the flow of current through said reactor is suddenly interrupted to permit the discharge of the energy stored in said reactor into said secondary circuit comprising a charged capacitor and means to connect said charged capacitor across said discharge device in opposite polarity to the potential across said device.

8. In electric resistance welding apparatus having an induction device for the electromagnetic storage of welding energy and comprising a magnetic core with primary and secondary windings, a circuit for supplying direct current to said primary winding, and means to interrupt the flow of current in said circuit and primary winding whereby the energy stored in said device may be discharged into said secondary winding by the collapse of the electromagnetic field comprising in combination a switch in said circuit and a capacitance connected across said primary winding, the arrangement being such that the energy-absorbing characteristic of said capacitance is utilized to increase the speed of current interruption by said switch whereby the rate of decay of said field and the rate of rise and peak value of the current induced in said secondary is increased.

9. In electric resistance welding apparatus having an inductive circuit for the electromagnetic storage of welding energy, a conductor adapted to be electrically connected at its terminals with the work to be welded and positioned in operative inductive relation with respect to said circuit, means for supplying direct current to said circuit, and means to interrupt the flow of current in said circuit whereby the electromagnetic energy stored therein may be discharged into said conductor and work by the collapse of the electromagnetic field comprising in combination a switch in said circuit and a capacitance connected across the inductive portion of said circuit, the arrangement being such that the absorption by and the release of energy from said capacitance increases the speed of current interruption by said switch and causes reversal of the current flow in said inductive portion of said circuit thus increasing the rate of rise and the peak value of the current induced in said conductor.

10. In electric resistance welding apparatus having a circuit with an inductive portion for the electromagnetic storage of welding energy and means for supplying direct current to said circuit, a conductor adapted to be connected at its terminals to the work pieces to be welded and positioned in operative inductive relation with respect to said circuit portion, and means to interrupt the flow of current in said circuit whereby the electromagnetic energy stored in said inductive portion may be discharged into said conductor and work pieces comprising in combination a circuit opening device and a capacitance connected across said inductive portion, the arrangement being such that said capacitance together with said inductive portion of said circuit constitute an oscillatory tank circuit wherein the reversal of current flow increases the rate of rise and the peak value of the current induced in said conductor and applied to said work pieces.

11. In electric resistance welding apparatus of the electromagnetic energy storage type the method of increasing the rate of rise and the peak value of the welding current induced in the welding circuit upon interruption of current flow in the primary circuit which consists of inserting a capacitance of small value as compared to the value of the inductance of the primary circuit of the induction device utilized in parallel with the inductive portion of said primary circuit.

12. In electric resistance welding apparatus of the electromagnetic energy storage type having an inductive reactor and a secondary welding circuit positioned in operative inductive relation with respect to said reactor the method of controlling the rate of rise and peak value of the current induced in said secondary circuit upon interruption of current flow in the primary circuit which consists of applying capacitive reactance of predetermined value in parallel with the inductive reactance of said reactor.

13. In electric resistance welding apparatus of the electromagnetic energy storage type having an inductive reactor and a secondary welding circuit positioned in operative relation with respect to said reactor for translating the energy stored in said reactor to the resistance welding load the combination of means to furnish direct current to said reactor, means to interrupt the flow of said current, and means to control the rate of decay of the current induced in said secondary circuit comprising a resistance of predetermined value connected across said reactor.

14. A welding system comprising a welding load circuit, electrostatic energy storage means, magnetic energy storage means, means for storing energy in each of said storage means, and means to deliver the energy stored in each of said energy storage means successively to said load circuit to supply a single pulse of welding current thereto.

GEORGE S. MIKHALAPOV.